US009689626B2

(12) United States Patent
Van Heeswijk et al.

(10) Patent No.: US 9,689,626 B2
(45) Date of Patent: Jun. 27, 2017

(54) HIGH EFFICIENCY HEAT EXCHANGER AND DEHUMIDIFIER

(75) Inventors: Frederik Simon Van Heeswijk, Amersfoort (NL); Johannes Antonius Reinders, Warnsveld (NL); Paul Magnus Clarkson, The Hague (NL); Andreas J. L. Nijsen, Enschede (NL)

(73) Assignee: Oxycom Beheer B.V., Raalte (NL)

( * ) Notice: Subject to any disclaimer, the term of this patent is extended or adjusted under 35 U.S.C. 154(b) by 863 days.

(21) Appl. No.: 12/514,327

(22) PCT Filed: Nov. 9, 2007

(86) PCT No.: PCT/EP2007/062157
§ 371 (c)(1),
(2), (4) Date: May 11, 2009

(87) PCT Pub. No.: WO2008/055981
PCT Pub. Date: May 15, 2008

(65) Prior Publication Data
US 2011/0120685 A1 May 26, 2011

(30) Foreign Application Priority Data

Nov. 9, 2006 (GB) .................................... 06223556
Dec. 22, 2006 (WO) ................ PCT/NL2006/050332

(51) Int. Cl.
*F28F 1/12* (2006.01)
*B01D 53/26* (2006.01)
(Continued)

(52) U.S. Cl.
CPC .............. *F28F 1/12* (2013.01); *B01D 53/265* (2013.01); *F24F 3/1405* (2013.01);
(Continued)

(58) Field of Classification Search
CPC ...... F28D 5/02; F28D 21/0015; F24F 3/1405; B01D 53/265; F28F 1/126; F28F 2215/12
(Continued)

(56) References Cited

U.S. PATENT DOCUMENTS 2,825,210 A 3/1958 Carr
3,046,639 A 7/1962 Freyholdt
(Continued)

FOREIGN PATENT DOCUMENTS

CH          231124      5/1944
DE       10025486 A1  11/2001
(Continued)

*Primary Examiner* — Emmanuel Duke
(74) *Attorney, Agent, or Firm* — NLO; Catherine Shultz; Minerva Rivero

(57) ABSTRACT

A heat exchanger (20) comprising: a pair of generally planar, heat conducting plates (10) arranged in spaced, generally parallel relationship; spacing elements (22) separating the plates (10) from one another and defining first (26) and second (28) flow channels between the plates (10) for flow in a first direction and a second direction respectively; wherein the plates (10) in at least the first channel (26) are divided into fins (14), the fins being separated from each other in the first direction and being offset from the plate (10) perpendicular to the first direction to a plurality of offset positions.

24 Claims, 13 Drawing Sheets

(51) Int. Cl.
*F24F 3/14* (2006.01)
*F28D 5/02* (2006.01)
*F28D 21/00* (2006.01)
*F24F 5/00* (2006.01)
*F28D 5/00* (2006.01)
*F28D 9/00* (2006.01)
*F24F 1/00* (2011.01)

(52) U.S. Cl.
CPC .............. *F24F 5/0035* (2013.01); *F28D 5/00* (2013.01); *F28D 5/02* (2013.01); *F28D 9/0062* (2013.01); *F28D 21/0015* (2013.01); *F24F 2001/0092* (2013.01); *Y02B 30/545* (2013.01); *Y10T 29/4935* (2015.01); *Y10T 29/49378* (2015.01)

(58) Field of Classification Search
USPC ............. 62/94, 310–316, 304, 515; 165/135, 165/164–169, 177, 180–183, 185, 905, 165/110, 170
See application file for complete search history.

(56) References Cited

U.S. PATENT DOCUMENTS

| | | | | |
|---|---|---|---|---|
| 3,912,003 | A | | 10/1975 | Schrade |
| 4,002,040 | A | * | 1/1977 | Munters et al. ................ 62/121 |
| 4,147,210 | A | | 4/1979 | Pronko et al. |
| 4,544,513 | A | * | 10/1985 | Otterbein .............. F24F 5/0035 165/166 |
| 4,575,435 | A | * | 3/1986 | Kuhl ............................... 261/94 |
| 4,724,902 | A | * | 2/1988 | Gross ............................ 165/166 |
| 4,758,385 | A | * | 7/1988 | Acker ................... F24F 5/0035 261/104 |
| 4,804,041 | A | * | 2/1989 | Hasegawa ............ F28D 1/0366 165/166 |
| 4,846,266 | A | * | 7/1989 | Acker ..................... F28F 25/04 165/115 |
| 5,035,052 | A | | 7/1991 | Suzuki |
| 5,301,518 | A | * | 4/1994 | Morozov .............. F24F 5/0007 261/153 |
| 5,349,829 | A | | 9/1994 | Tsimerman |
| 5,628,363 | A | | 5/1997 | Dewar et al. |
| 5,655,600 | A | | 8/1997 | Dewar et al. |
| 5,775,121 | A | * | 7/1998 | Kuma et al. ..................... 62/314 |
| 6,273,183 | B1 | * | 8/2001 | So et al. ..................... 165/109.1 |
| 6,415,855 | B2 | * | 7/2002 | Gerard et al. ................ 165/166 |
| 2001/0032477 | A1 | * | 10/2001 | Schlom et al. ................. 62/310 |
| 2002/0029871 | A1 | | 3/2002 | Kern |
| 2004/0226698 | A1 | * | 11/2004 | Reinders ................ B01D 53/28 165/110 |
| 2006/0124287 | A1 | * | 6/2006 | Reinders ............... F24F 5/0035 165/166 |

FOREIGN PATENT DOCUMENTS

| | | | | |
|---|---|---|---|---|
| EP | 0215344 A1 | | 3/1987 | |
| EP | 1668297 A1 | * | 6/2006 | ............... F24F 5/00 |
| GB | 2122738 A | | 1/1984 | |
| JP | 57155087 | * | 9/1982 | ............... F28D 9/00 |
| JP | 57155087 A | | 9/1982 | |
| JP | 58035387 A | * | 3/1983 | |
| JP | 58035387 A | | 3/1983 | |
| JP | 2004219043 | * | 8/2004 | ............... F24F 7/08 |
| WO | 9710476 A1 | | 3/1997 | |
| WO | 0031485 A1 | | 6/2000 | |
| WO | 03091633 A1 | | 11/2003 | |
| WO | 03091648 A1 | | 11/2003 | |
| WO | 2004076931 A2 | | 9/2004 | |
| WO | 2005019739 A1 | | 3/2005 | |
| WO | 2007071796 A1 | | 6/2007 | |
| WO | 2007089134 A1 | | 8/2007 | |

* cited by examiner

HIGH EFFICIENCY HEAT EXCHANGER AND DEHUMIDIFIER

BACKGROUND OF THE INVENTION

1. Field of the Invention

The present invention relates to high efficiency heat exchange devices of the type that can exchange heat between a primary or product air stream and a secondary or working air stream subject to a minimal heat differential. Such devices can operate to provide heat recovery in combination with ventilation for domestic purposes and can also be used in evaporative cooling devices. The invention also relates to the use of such a high efficiency heat exchanger in combination with a cooling device in order to dehumidify air.

2. Description of the Related Art

Heat exchange devices of one form or another are present in virtually every device and process. The performance of an action invariably involves the release of energy in the form of heat. If not required, the heat will often be released to ambient via an appropriate heat conducting surface provided e.g. with cooling fins. If the quantity of heat is excessive or if it can be employed for useful purposes, a specific heat exchanger may be provided to transport the heat away e.g. to another system. Heat exchange may also take place between different media:—gas, liquid and solid media can be interfaced in all combinations according to the performance required. The present invention relates to heat exchangers of the air-to-air type. It is nevertheless the case that the heat is transferred from one air stream to the other by conduction through a solid medium.

Air-to-air heat exchangers are most commonly formed as membrane or plate type heat exchangers. A primary channel is separated from a secondary channel by a heat conducting plate or membrane. Primary and secondary streams of air flow through the respective channels and heat is transmitted from one stream to the other through the conducting wall. For optimum efficiency, the air streams will be arranged to flow generally opposite to one another in counter-flow. In certain situations practicality dictates that flow should take place in cross-flow, whereby one fluid flows perpendicular to the other. Generally, the heat conducting membrane will be formed of a material having good thermal conduction properties. Metals, in particular steel and aluminium may therefore be favoured. In certain situations however, materials with lower thermal conductivity may be used, subject to the thickness of the material being minimised. Since the quantity of heat transferred through a membrane is proportional to the temperature gradient across it, reducing the thickness of a membrane can quickly offset a decrease in thermal conductivity.

A problem that can arise with certain membrane and plate heat exchanger designs is the presence of unwanted heat conduction along the heat exchanger in the flow direction. This problem is significant in high efficiency heat exchangers designed to operate across a low temperature gradient. For a counter flow arrangement, heat conduction through the heat exchanger in the direction of flow leads to a reduction in the heat differential between inlet and outlet. For this reason, plastics materials have often be favoured for heat recovery devices in heating and ventilation systems.

It has also been previously proposed to install plates in a heat exchanger in such a manner that the plate itself transfers heat within its plane from the first stream to the second stream. Separation of the first and second channels is provided by separators between adjacent plates rather than by the plate itself. Since the separator no longer has a heat transmitting function it may be manufactured from an insulating material, thus reducing the cross-section for heat flow in the longitudinal direction of flow. A device of this type has been shown in JP58035387 A. Nevertheless, this principle of operation has not been generally adopted, possibly due to increased manufacturing complexity in achieving a large surface area and only limited improvement in efficiency. A further device that has attempted to improve the efficiency of heat exchange is shown in U.S. Pat. No. 5,832,992. According to that publication, a plurality of wires are arranged in mats through which air may flow. The wires are relatively closely packed together having a pitch of 1.5 to 2.5 times the wire diameter.

Another field that is closely related to heat exchange is that of (de)humidification. In the heating, cooling, ventilation and air-conditioning industries, heat exchange and dehumidification or humidification go hand in hand. Humidification is generally simpler as the increase in entropy facilitates the process. Dehumidification however requires energy and is a considerable burden on designers. Conventional dehumidifiers make use of a desiccant wheel using e.g. silica gel or the like. The desiccant absorbs moisture from an air stream passing over it. By absorbing vapour, considerable energy is released causing the air stream or the desiccant wheel to be heated. In cooling systems, this heat of absorption reduces the effectiveness of the cooling. The desiccant must also be periodically regenerated by evaporating off the absorbed moisture. This step also requires considerable energy corresponding to the latent heat of evaporation of the liquid. A desiccant wheel of this type is known from U.S. Pat. No. 5,542,968.

For air of high humidity, alternative manners of dehumidifying have also been suggested. By cooling the air to below its dew point, condensation of vapour will occur. Although the air will remain close to the level of 100% relative humidity, its absolute humidity will drop. On subsequently warming the air (in the absence of water) to its original temperature, the relative humidity will fall while absolute humidity will remain constant. The method is relatively efficient in theory but in practice requires a high efficiency heat recovery element in order to achieve the desired results. For this reason, the principle has not been widely used for dehumidification in cooling and ventilation systems. One device of this type has been described in EP0861403 A.

BRIEF SUMMARY OF THE INVENTION

According to the invention there is provided a heat exchanger comprising a pair of generally planar, heat conducting plates arranged in spaced, generally parallel relationship; spacing elements separating the plates from one another and defining first and second flow channels between the plates for flow in a first direction and a second direction respectively; wherein the plates in at least the first channel are divided into fins, the fins being separated from each other in the first direction and being offset from the plate perpendicular to the first direction to a plurality of offset positions.

In a preferred embodiment the heat exchanger comprises a water retaining surface on the fins in at least the second channel and a source of water for wetting the fins in the second channel. In this manner the heat exchanger can be used for indirect evaporative cooling.

Most preferably, the water retaining surface is provided on one surface of the fins only.

The water retaining surface may be a separate layer, which is for instance coated or adhered onto the fins, or may be formed as a surface treatment of the fins to improve its hydrophilicity.

Water retaining elements as part of the fin surface, such as a roughened surface, may be achieved by etching or similar processes.

Cementitious materials such as Portland cement have in the past been found highly desirable for use as water retaining layers. Alternatively, fibre materials may be used. It has been found to be of great importance that the water retaining layer should not obstruct heat transfer from the plate by insulating it from the secondary flow.

In a preferred embodiment a flexible water retaining surface is provided on the fins. By providing a flexible water retaining surface, desired properties such as the spatial distribution of the liquid retaining surface, can be imparted to the fins prior to forming. The fins may then be conveniently formed into the desired shape.

In a desirable embodiment, the water retaining layer has an open structure such that in use, a heat exchange medium can directly contact the fin surface through the open structure of the water retaining layer. By this means, the ability of the heat exchanger to transfer both thermal heat and latent heat to a fluid medium flowing over it is enhanced. The open structure may comprise spaces between the fibres of a fibrous material forming the water retaining layer. Such a fibrous material may be a woven or non-woven layer having an open structure.

The fibrous material may be attached to the fins by adhesives or other similar methods. Preferably, the adhesive and the fibrous material should be such that delaminating does not take place on forming of the fin into a desired shape. Where adhesive is used, the adhesive may be chosen to enhance the properties of the fin or water retaining layer. Thus the adhesive may be chosen to have water-retaining properties or heat conducting properties, or both and may thus be considered to form a part of either of these layers.

For indirect evaporative coolers, it can be advantageous to provide the water retaining surface on the fins in the second flow channels only. Provision of a water retaining layer in the first channels can result in a reduced coefficient of heat transfer from the air stream to the fins in the first channel because of thermal insulating properties. The provision of water retaining surfaces in the first channels of an indirect evaporative cooler may also be prohibited by law in certain markets.

A preferred embodiment of the invention has a water retaining surface comprising material which has been printed, sprayed or transferred onto the fins. This printed material may be hydrophilic in order to retain the water or may be provided in a pattern that acts to retain water by surface tension or capillary action. Such a pattern may for instance comprise isolated regions of material, the isolated regions being spaced by a distance that allows water retention while leaving portions of the underlying fin open to the air stream. In place of or in addition to isolated regions of material, interlinked regions providing the desired water retention may also be provided.

A preferred method of printing a material onto the fin surfaces is inkjet printing.

A particular advantage of the inkjet printed method is that it can be placed very accurately onto the fins or onto a plate which is subsequently formed into fins. This allows for the water retaining surface to be provided in only the second channels and not the first channels; it also allows for patterned distributions of a water retaining surface.

In indirect evaporative cooling it is the latent heat of evaporation which creates the cooling effect. In order to ensure that this cooling effect, which takes place in a wet channel of an indirect evaporative cooler, is efficiently transferred to a dry channel, the water uptake should take place as much as possible at the fin surfaces. This ensures that the heat sink area is in a close thermal contact with the dry channel.

The provision of fins offset to a plurality of positions from the plane of the plate is particularly advantageous in the case of indirect evaporative cooling. As will be discussed in greater detail below it is believed that the provision of fins in a plurality of offset positions reduces laminar boundary flow within an air stream flowing over the fins. By reducing laminar boundary flow a better uptake of water at the fin surfaces is achieved and this in turn leads to a more efficient indirect evaporative cooling.

In accordance with a preferred embodiment of the invention there is provided an indirect-evaporative cooler, preferably a dew point cooler, comprising a heat exchanger in accordance with the invention provided with a water retaining surface on the fins in at least the second channel and a source of water for wetting the fins in the second channel.

According to a preferred embodiment of the heat exchanger of the invention, the fins are arranged sequentially in repeating groups in the first direction, the fins of each repeating group being offset from one another perpendicular to the first direction. Preferably, the fins of each repeating group are offset from one another to one of at least five offset positions. In this context it may be noted that five offset positions of the fins relative to one another may correspond to four positions relative to the plate, since one fin may coincide with the plane of the plate. By forming the fins in repeating groups, it is also easier to manufacture them from a plate of an appropriate heat conducting material in an automated procedure.

In a preferred embodiment of the invention the fins in a channel are each divided from the plate and formed so that they have the same absolute length. The absolute length of a fin is measured as the distance along the contour of the fin between the points at which the fin is connected to the plate. The absolute length (L) of a fin is illustrated in FIG. 9 as a dashed line running parallel with one of the formed fins.

By forming each of the fins with the same absolute length, distortions in the plate due to forming of the fins in the plate can be avoided.

According to a further embodiment, a plurality of heat conducting plates may thus be provided and arranged upon one another in spaced, generally parallel relationship with spacing elements defining primary and secondary flow channels between each adjacent pair of plates. In such a manner, a stacked heat exchanger can be produced providing a high heat exchange capacity per unit volume.

Most preferably, the spacing element or elements comprise thermally insulating material. This can serve to reduce parasitic heat conduction in the flow direction. It is however perfectly possible to also use conducting spacers to increase heat transfer from the first to the second channel. In that case, thermal barriers may be desired to reduce longitudinal conduction of heat.

According to an alternative embodiment of the invention there is provided a heat exchanger comprising a first flow channel for flow in a first direction, a second flow channel for flow in a second direction, a spacing element separating the first flow channel from the second flow channel and a plurality of heat conducting fins extending through the spacing element and into both the first and second flow channels, the fins in at least the first channel having a chord length and being arranged in repeating groups, whereby the fins of each repeating group are staggered with respect to one another in the first direction and offset from one another in a direction perpendicular to the first direction and whereby the pitch of corresponding fins in adjacent groups in the first direction corresponds to at least three times the chord length.

By providing a plurality of fins that are spaced from one another in the flow direction and which are offset from one another in a direction normal to the flow, a greater heat transfer coefficient of the heat exchanger can be achieved. Also a greater rate of water uptake from a wetted fin surface can be achieved.

While not wishing to be bound by theory, it is believed that the flow is repeatedly interrupted by each fin and the limited length of the fin in the flow direction reduces the build up of the boundary layer. Inline with this theory the fins are arranged in a matrix, each fin having a carefully chosen position within this matrix. The position of each fin within the matrix is chosen taking into account the following considerations.

It is believed that as a flow of media, for example gas, passes over a fin, a boundary layer is gradually created within the flow at the fin's surface, this creates what is known as laminar flow. This boundary layer acts as an insulating layer reducing thermal transfer between the main body of the media and the fin. The result is a reduction in thermal transfer as the medium flows along the length of the fin. In the case of indirect evaporative coolers, this boundary layer is believed to produce a layer of high humidity air over the fin surface. This layer has a reduced ability to take up water because of its high humidity. It also prevents the less humid air from the main body of the air stream reaching the fin surface for water uptake. The presence of such a boundary layer is therefore disadvantageous because it reduces thermal transfer in heat exchangers and reduces water uptake in indirect evaporative coolers.

To reduce the build up of laminar flow in the heat exchanger due to the creation of a boundary layer at the fin surfaces, the fins are limited in length in the flow direction. In this manner, before or once a boundary layer has formed at the fin surface the media flows beyond the fin. Once the media flow is beyond the fin the laminar flow gradually reverts to turbulent flow. Taking this into consideration, fins which are inline in the flow direction are suitably spaced such that by the time the media reaches the front edge of a downstream fin the laminar flow created by an upstream fin has sufficiently reverted to turbulent flow so that good thermal transfer can again take place. Likewise, this downstream fin is limited in length in the flow direction and is sufficiently spaced from a further downstream fin so that turbulent flow is re-established before the media reaches the next downstream fin. In this manner, laminar, insulating flow is sufficiently avoided and a good thermal transfer between the media and fins is obtained; and/or a good uptake of water from the fin surface is achieved.

A preferred pitch, that is the distance between the front edge of one fin to the front edge of an immediately following fin in the flow direction, is at least three chords, more preferably it is at least five chords. The chord length (c) is the length between the leading edge and the trailing edge of a fin, as taken in the flow direction (see FIGS. 1 and 6).

In addition to the above consideration, fins adjacent in the direction perpendicular to the flow direction should be sufficiently spaced to avoid excessive interference between the boundary layers of these adjacent fins.

Using these considerations, a matrix of fins may be provided which comprises columns of fins sufficiently spaced in the flow direction to avoid laminar flow and rows of fins sufficiently spaced in the direction perpendicular to the flow direction to avoid excessive boundary layer interference.

To achieve a greater efficiency of heat exchange it is advantageous to provide a large number of fins and consequently a large surface area for heat exchange. However, this should be done without encroaching upon the aforementioned considerations.

In a preferred embodiment, each repeating group comprises n fins and the pitch of the corresponding fins in adjacent groups in the first direction corresponds to n times the chord length. The fins of each repeating group are preferably offset from one another to one of n offset positions. More preferably n is at least 5 and each fin is spaced from the next adjacent fin by at least two offset positions.

The material for forming the heat conducting plates and fins should be a good conductor. Metals are therefore preferred, in particular aluminium as it is light and easily formed into the desired shapes.

For most purposes it is preferred that the device is arranged such that the first and second channels operate in counter flow. Nevertheless, cross flow operation may also be used, in particular, by arranging that the fins in one of the channels are oriented generally perpendicular to the fins in the other channel.

According to an important aspect of the present invention the heat exchanger forms the core of an indirect evaporative cooler. For this purpose, there is provided a water retaining surface on the fins in at least the secondary channel and a source of water for wetting the fins in the secondary channel. Air flowing in the secondary channel can absorb moisture from the water retaining surface. The latent heat for evaporation of the moisture serves to cool air flowing in the primary channel by heat conduction along the plates. Preferably the cooler is of the dewpoint cooling type, whereby the secondary flow has been pre-cooled e.g. by branching off a part of the primary flow. Due to the increased efficiency of the heat exchanger according to the present invention, lower temperatures may be achieved with a considerably more compact construction.

According to a yet further aspect of the present invention, there is provided a dehumidifier comprising the above heat exchanger in combination with a cooling element. The dehumidifier is arranged to pass a flow of air through the primary channel of the heat exchanger to the cooling element and to return the cooled air from the cooling element through the secondary channel. Condensed water forming in the heat exchanger and at the cooler may be collected and led away via suitable drains. Due to the increased efficiency of the heat exchanger, the overall efficiency of the dehumidifier is considerably improved. The cooling element may be a conventional air conditioning unit or may alternatively comprise a water cooled device.

For use as a dehumidifier or evaporative cooler there may also be provided a housing for receiving the heat exchanger, inlet ducts connecting to the primary channels, outlet ducts connecting from the primary and secondary channels, an air circulation device for causing circulation of air through the primary and secondary channels, a water supply or drain and a controller for controlling operation of the device. Such a device may then operate as a stand alone unit or may be integrated into a larger heating and ventilation system. Additionally, temperature, pressure, humidity and other such sensors may be provided within the housing for monitoring operation and where necessary providing feedback to the controller.

The invention also relates to a method of manufacture of a heat exchanger comprising: providing a generally planar heat conducting plate; forming the plate into a plurality of elongate fins joined to one another and being offset from the plane of the plate to a plurality of offset positions; applying elongate strips of spacing material to the plate to divide it into primary and secondary flow regions; applying a second formed plate onto the spacing material; alternately applying strips and formed plates to form a plurality of first and second flow channels.

In a preferred embodiment of the invention the spacing material is provided as a frame. Such a frame comprises a plurality of substantially parallel spacing elements spaced from one another and affixed at their outer ends to at least one support beam. The support beam acts to hold the spacing elements in the correct relation so that they can be easily brought to the portions of the plate intermediate the primary and secondary flow regions. Preferably the support beams are used as a temporary scaffold only and are removed, e.g. by cutting or snapping, after the spacing elements have been secured.

By using the frames a preferred method is provided comprising the steps of providing a first formed plate; applying a first frame of spacing elements to the formed plate; applying a second formed plate to the first frame of spacing elements; and applying a second frame of spacing elements to the second formed plate. These steps are continued until the desired number of plates are stacked. In this manner a stack of sandwiched plates and spacing elements can be constructed.

Adhesive is preferably provided to adhere the spacing elements to the plates. This adhesive is preferably a heat and/or pressure activated adhesive. It may conveniently be provided as a coating on the spacing elements.

The adhesive may be activated after each frame laying step. However, a preferred method of manufacture involves producing a stack of sandwiched plates and spacing elements and then applying heat and/or pressure to the stack in order to activate the adhesive. In this manner the adhesion step need only be carried out once for multiple plates.

A preferred method of activating a heat adhesive is to pass hot air through the stack.

The support beams are preferably removed from the frames of spacer elements after adhesion of the stack.

In an alternative embodiment, which may be used in combination or alternately to the frames of spacing elements, the substantially parallel plates are formed as a continuous sheet. The continuous sheet is formed into a stack of substantially parallel plates by folding it in a concertina like fashion. In this way a stack of substantially parallel plates can be formed from a single sheet of material. A simpler manufacturing process can thus be obtained.

In such a process a first set of spacing elements are applied to a first plate formed as part of a sheet; the sheet is then folded back on itself to sandwich the spacing elements between the first plate and a second plate part of the sheet; a second set of spacing elements is applied to the second plate part; and the previous steps are repeated to produce a stack of plates.

The invention further relates to a method of manufacture of a heat exchanger comprising, in no particular order, the steps of: providing a plurality of strips of elongate heat conducting material; forming a spacing element which separates a first flow channel and a second channel in the heat exchanger; and incorporating said strips of elongate heat conducting material into the spacing element so that each elongate strip forms a heat conducting fin extending through the spacing element and into both the first and second flow channels.

The strips of heat conducting material may be formed in a number of alternative manners such as by shredding, cutting or stamping a plate of heat conducting material or by extrusion of a suitable heat conducting material.

A further aspect of the invention relates to a method of manufacturing an evaporative cooler comprising the steps, in no particular order, of: providing a plurality of heat conducting fins, at least a part of each fin having a water retaining surface; incorporating the fins into a spacing element which separates a first flow channel and a second flow channel, such that each fin extends through the spacing element and into both the first and second flow channels, the water retaining surface being present in at least the second flow channel.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
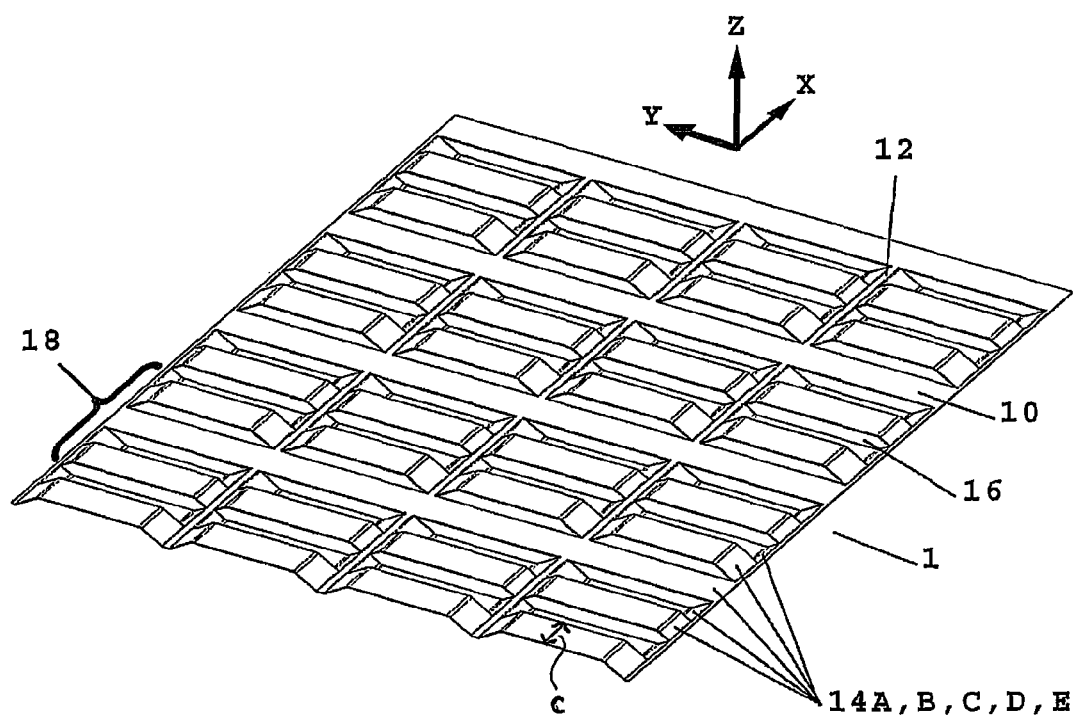
FIG. 1 shows a perspective view of a plate for a heat exchanger according to a first embodiment of the present invention.

FIG. 1 shows a perspective view of a heat exchange element 10 for use in the heat exchanger of the present invention. The heat exchange element 1 comprises a generally planar plate 10 formed of cold annealed aluminium sheet of around 70 micron thickness. The plate 10 comprises separator regions 12 extending generally in a straight line in a first direction X along the plate 10. The plate 10 is also divided into a series of elongate fins 14. The fins 14 extend generally in a direction Y perpendicular to the direction X and each fin 14 is separated from its neighbour by a slit 16. The fins 14 are thus in the form of bridges attached to the separator regions 12 at their ends. The fins 14 are arranged in groups 18. Each fin 14 A, B, C, D, E in a group 18 is offset out of the plane of the plate 10 in a direction Z by a different amount. The fins 14A and 14D are offset upwards while the fins 14B and 14E are offset downwards. Fin 14C lies in the plane of the plate 10. The groups 18 repeat themselves along the plate 10. Each fin has a chord length c taken as the length between the leading edge and the trailing edge of the fin in the flow direction.

Figure 2:
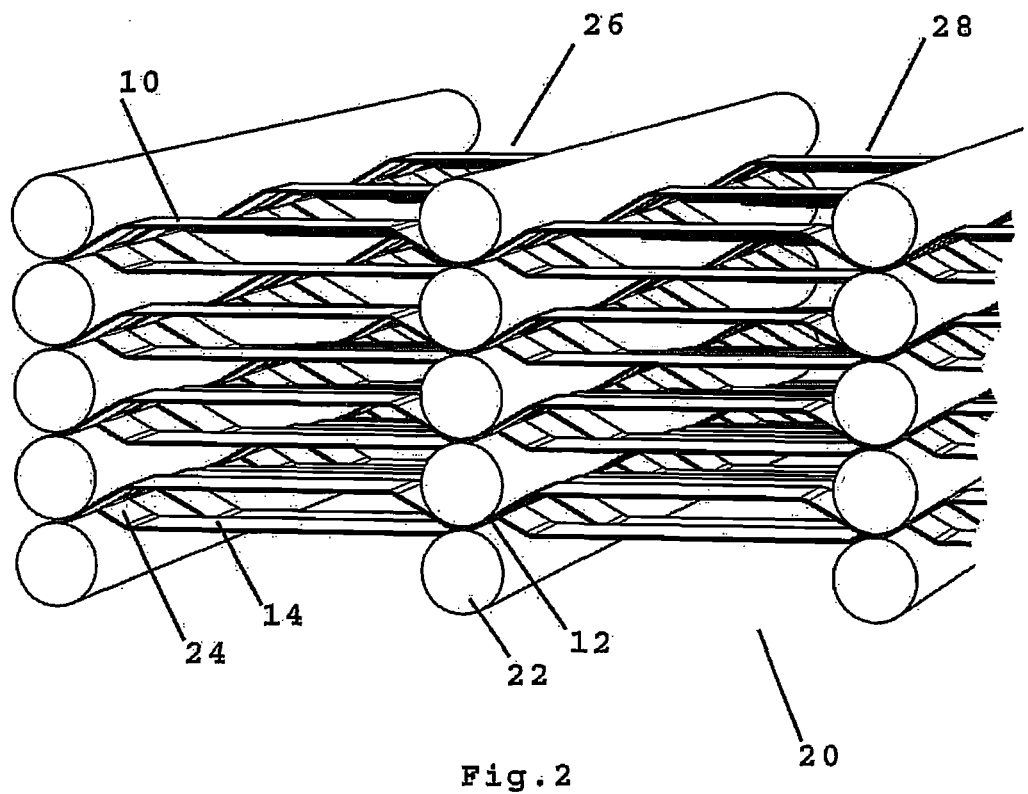
FIG. 2 shows a perspective view of part of a heat exchanger according to the first embodiment of the present invention.

FIG. 2 shows a perspective view of part of a heat exchanger 20 of the present invention formed from a number of plates 10 as described in FIG. 1. According to FIG. 2, plates 10 are arranged in a stacked relationship with spacers 22 located in the separator regions 12 between adjacent plates 10. Spacers 22 comprise a thermoplastic adhesive which serves both to space the plates 10 and also to bond them together. As can be noted from FIG. 2, fins 14 have ramp portions 24 connecting to the separator regions 12. The ramp portions 24 assist in locating the spacers 22 and confining them to lie along the separator regions 12. As can also be seen from FIG. 2, the spacers 22 divide the heat exchanger 20 into a primary flow channel 26 and a secondary flow channel 28.

Figure 3:
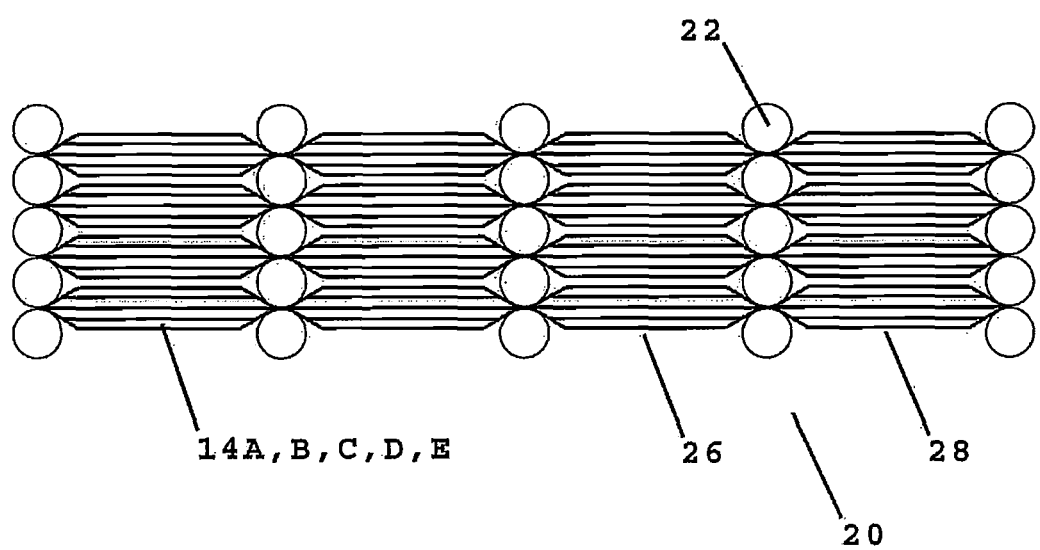
FIG. 3 shows a front elevation of the heat exchanger of FIG. 2.

FIG. 3 shows a front elevation of the heat exchanger 20 of FIG. 2. As can be seen from FIG. 3, spacers 22 form effectively a membrane separating the primary channel 26 from the secondary channel 28. Also from FIG. 3, the offset relationship of the fins 14 A, B, C, D, E can be seen.

Figure 10:
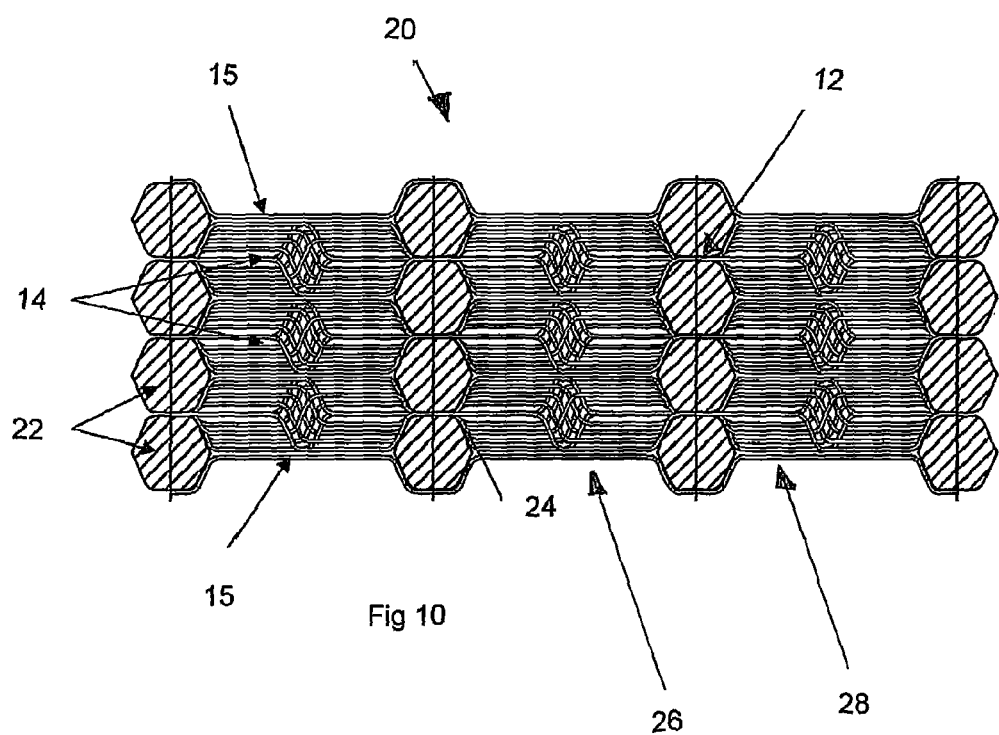
FIG. 10 shows a front elevation of a heat exchanger comprising the fins of FIG. 9.

FIG. 10 shows a front elevation of an alternative heat exchanger 20. The spacers 22 provided in FIG. 10 have a hexagonal cross-section. This hexagonal cross-section, similarly to the spacers 22 of FIG. 2, abuts the ramp portions 24 of the fins 14, which portions form a cooperative seat in which the spacers 22 fit. In this way a secure and accurate location of the spacing elements 22 is achieved. It will be clear to those skilled in the art that other cross-sections may be used for the spacers 22.

Figure 9:
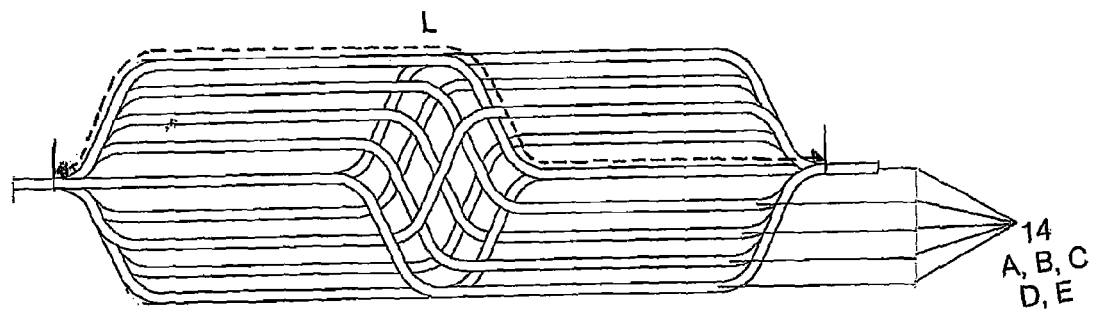
FIG. 9 shows a front elevation of a part of a plate for a heat exchanger formed into fins.

FIG. 9 also shows an alternative fin formation to that shown in FIGS. 1 to 3. As can be seen, the fins in FIG. 9 are formed so that each one has the same absolute length (L) as the other fins in the channel. The absolute length of a fin is measured as the distance along the contour of the fin between the points at which the fin is connected to the plate, and is illustrated by the dashed line marked L in FIG. 9.

When forming fins in a plate, disadvantageous contortions of the plate may occur, this is particularly the case when the fins are formed by stamping from a plate. By ensuring that the fins are all formed to have the same absolute length these contortions can be avoided.

The heat exchanger constructions of FIGS. 2, 3, and 10 can be formed by a method in which a generally planar heat conducting plate is formed into a plurality of elongate fins joined to one another and being offset from the plane of the plate to a plurality of offset positions. The fins can be formed by first cutting the plate to form a series of joined strips in the same plane and then secondly stamping, bending, stretching or similarly forming the fins into the desired shape to give the desired offset positions for the fins 14.

Once the plate has been formed the spacers 22 are placed in the separator regions 12. Here they are temporarily held by the ramp portions 24. A second formed plate is then added to the spacers 22, resting its separator portions 12 on top of the spacers. These steps are then repeated to construct a stack of sandwiched spacers and plates as shown in FIGS. 2, 3 and 10.

The spacers 22 are conveniently provided as an injection moulded frame comprising a plurality of parallel spacers joined at their ends by a support beam and spaced to correspond with the separator regions 12 of the plates. This advantageously means that the spacers can be laid on the plates in bulk.

The spacers 22 are provided with an outer surface of heat activated adhesive. Once the stack has been constructed hot air is blown through the stack and pressure is applied pushing the spacers 22 toward one another. In this manner the adhesive is activated and the stack is adhered together.

After the stack has been adhered the support beams present on the frames are removed.

In an alternative method the spacers 22 are extruded from a multi-nozzled extrusion head directly into the separator regions 12. The spacers are preferably co-extruded with a bead of heat activatable adhesive arranged to contact the above and below plate surfaces. This adhesive provides an initial tack which temporarily holds the stack together during manufacturing. After completion of the stack, hot air is passed through the stack to activate the adhesive and pressure is applied along the lines of spacers pushing the stack together.

An accurate stack height can be achieved by the application of pressure to compress the spacers.

In FIG. 10 a final layer 15 is provided which seals the channels 26, 28 to form passages for air flow over the fins 14.

Figure 4:
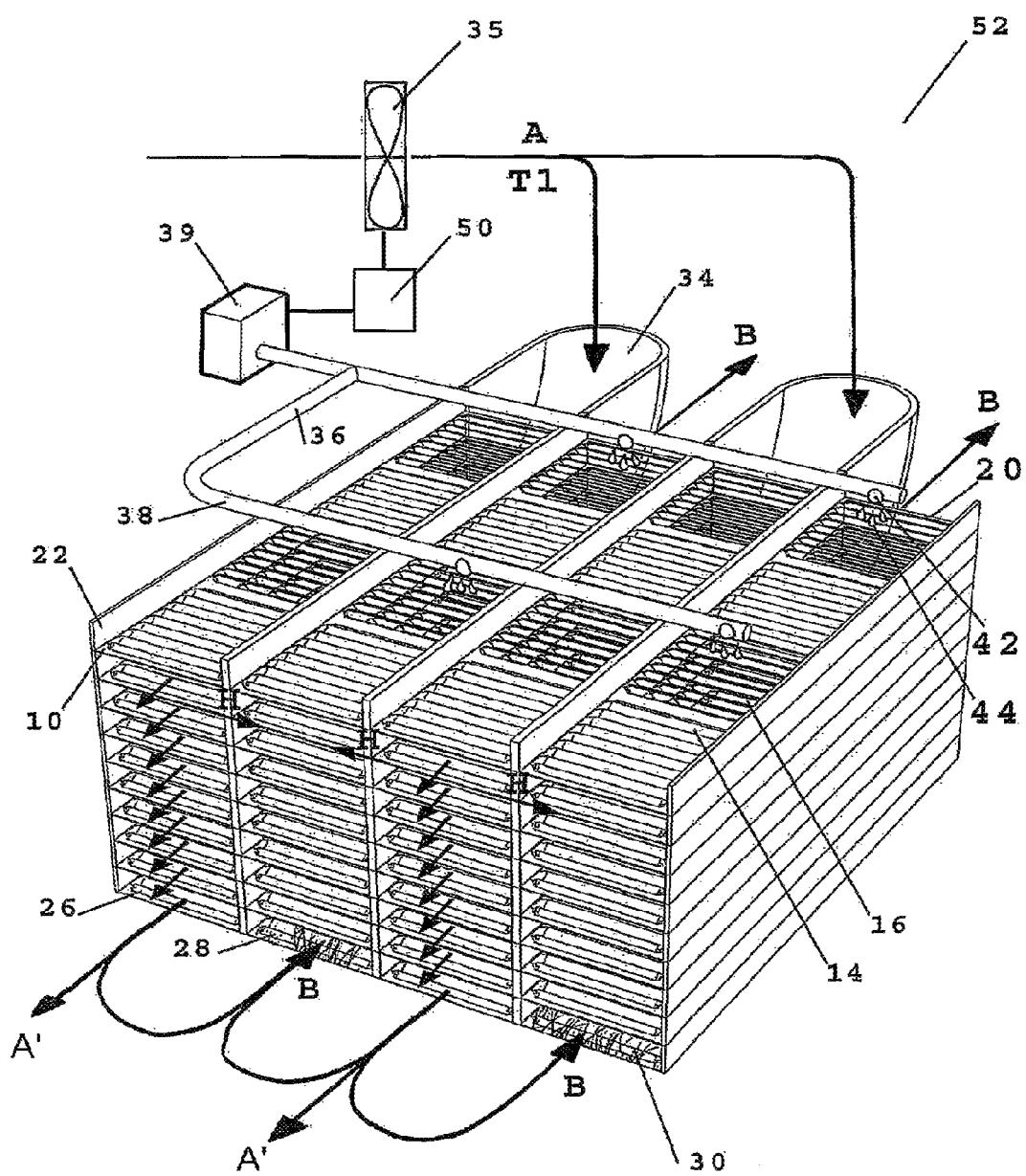
FIG. 4 shows a perspective view of a heat exchanger constructed as a dew point cooling device.

FIG. 4 shows a perspective view illustrating how the heat exchanger 20 of FIG. 2 could be built up into a dew point cooler 52. The dew point cooler of FIG. 4 is depicted here to illustrate the basic principles of construction of a dew point cooler and is not restrictive to the invention. The fins 14 illustrated are one type of fin that may be used in a dew point cooler. Preferably, however, the fins 14 are arranged in a manner (not shown in FIG. 4) determined in line with the principles laid out above, that is that the fins should be appropriately spaced to avoid laminar flow and boundary layer interference. For the sake of simplicity only thirty two short channels are shown, it being understood that in reality, the plates 10 may extend considerably further in all directions whereby both the length and number of the channels 26, 28 would be greater.

According to FIG. 4, the plates 10 in the secondary channels 28 are provided with a liquid retaining layer 30. For the sake of convenience, this layer 30 is only partially shown. FIG. 4 also illustrates inlet duct 34 for the primary channels 26. The inlet ducts 34 are formed by the material of the spacers 22 extending beyond the plates 10. This material may then be formed by suitable moulding techniques into a closed inlet duct 34. The inlet ducts 34 serve to direct inlet air flow A from a circulation device 35 to the primary channels 26 and to keep it separate from the air flow B exiting the secondary channels 28. In use as a dewpoint cooler, the flow B will usually be saturated with moisture and will be exhausted. It is understood that other methods of forming ducts as inlets or outlets for either the primary 26 or the secondary 28 channels may also be employed as required.

A water distribution system 36 is also illustrated in FIG. 4. The water distribution system 36 is in the form of a series of conduits 38 leading from a water supply 39 to outlets 42 for ejecting droplets 44 of water into the secondary channels 28. The slits 16 between fins 14 allow the droplets 44 to pass through the plates 10 to the further plates 10 located below. Alternative water distribution systems may also be used. A preferred arrangement is the system presently used in the Oxycell Rooftop 400 evaporative cooler substantially as described in International Patent Publication No. WO04/076931, the content of which is hereby incorporated by reference in its entirety. Both the water supply 39 and the circulation device 35 are controlled by a controller 50. The device may be enclosed in an appropriate housing (not shown).

An important factor for the efficient operation of an evaporative cooler is the nature of the liquid retaining layer 30. Although reference is made to a liquid retaining layer, it is clearly understood that the layer is in fact a liquid retaining and releasing layer. A requirement of such a layer is that it easily gives up its water such that minimal resistance to evaporation is encountered. It is also important that it should distribute water quickly and effectively to all relevant surfaces. It should thus be hydrophilic without being hygroscopic, preferably retaining water primarily by surface tension effects.

In the embodiment of FIG. 4, the liquid retaining layer 30 is formed from a fibrous material. The layer 30 is schematically illustrated to have a very open structure such that the metal of the fins 14 can be seen through the spaces between the fibres of the layer 30. This is believed to encourage direct heat transfer from the fins 14 without smothering them. Prior art devices using thick wicking layers have effectively insulated the heat transmitting layer preventing transfer of thermal heat. An exemplary material for forming the water retaining layer 30 is a 20 g/m$^2$ polyester/viscose 50/50 blend, available from Lantor B.V. in The Netherlands. Another exemplary material is a 30 g/m$^2$ polyamide coated polyester fibre available under the name Colback™ from Colbond N.V. in The Netherlands. Other materials having similar properties including synthetic and natural fibres such as wool may also be used. Where necessary, the liquid retaining layer 30 may be coated or otherwise treated to provide anti bacterial or other anti fouling properties.

The liquid retaining layer 30 may be adhesively attached to the plate 10. For use with aluminium and Lantor fibres as mentioned above, a 2 micron layer of two-component polyurethane adhesive has been found to provide excellent results. When present as such a thin layer, its effect on heat transfer is negligible. It should furthermore be noted that the presence of the liquid retaining layer only influences heat transfer from plate 10 into the secondary flow B and does not have any significant influence on heat conduction within the plate 10 between the primary 26 and secondary 28 channels. The above-described fibrous layers have been found ideal for the purposes of manufacturing since they can be provided as a laminate that can be formed fins and other shapes in a continuous process. Other liquid retaining layers such as Portland cement may also be used and have in fact been found to provide superior properties although as yet, their production is more complex since there is a tendency to crack or flake if applied prior to forming of the heat exchange element. It is nevertheless believed that other surface finishes such as aluminium oxide may themselves be adequate for providing the water retention and wicking required.

Operation of the dew point cooler 52 as depicted in FIG. 4 will now be described. A primary air flow A enters inlet 34 at a temperature T1 and flows through primary channels 26. The flow A is driven by a circulation device 35. The flow A is cooled by heat transfer to the plate 10 to a temperature T2 close to its dew point. On exit from the primary channel 26 the cooled primary flow A is split to form a cooled product flow A' and secondary flow B. The product flow A' is delivered by appropriate ducts to wherever the cooled air is required. The secondary flow B is returned through the secondary channels 28. As the secondary flow returns, it is heated by heat transfer from the plate 10 and takes up moisture by evaporation from the liquid retaining layer 30. On exit from the secondary channel 28, the flow B will have returned to close to its original temperature T1 but will be almost 100% saturated. The difference in enthalpy between the flows A and B represents the amount of cooling available for the product flow A'.

In the arrangement of FIG. 4, it is noted that heat may be conducted in both directions H through the plate 10 from a primary channel 26 to the secondary channels 28 on both sides thereof. Heat can also transfer in the direction of flow, which is generally undesirable. The presence of fins 14 reduces longitudinal heat transfer which is limited to the separator regions 12.

Figure 5:
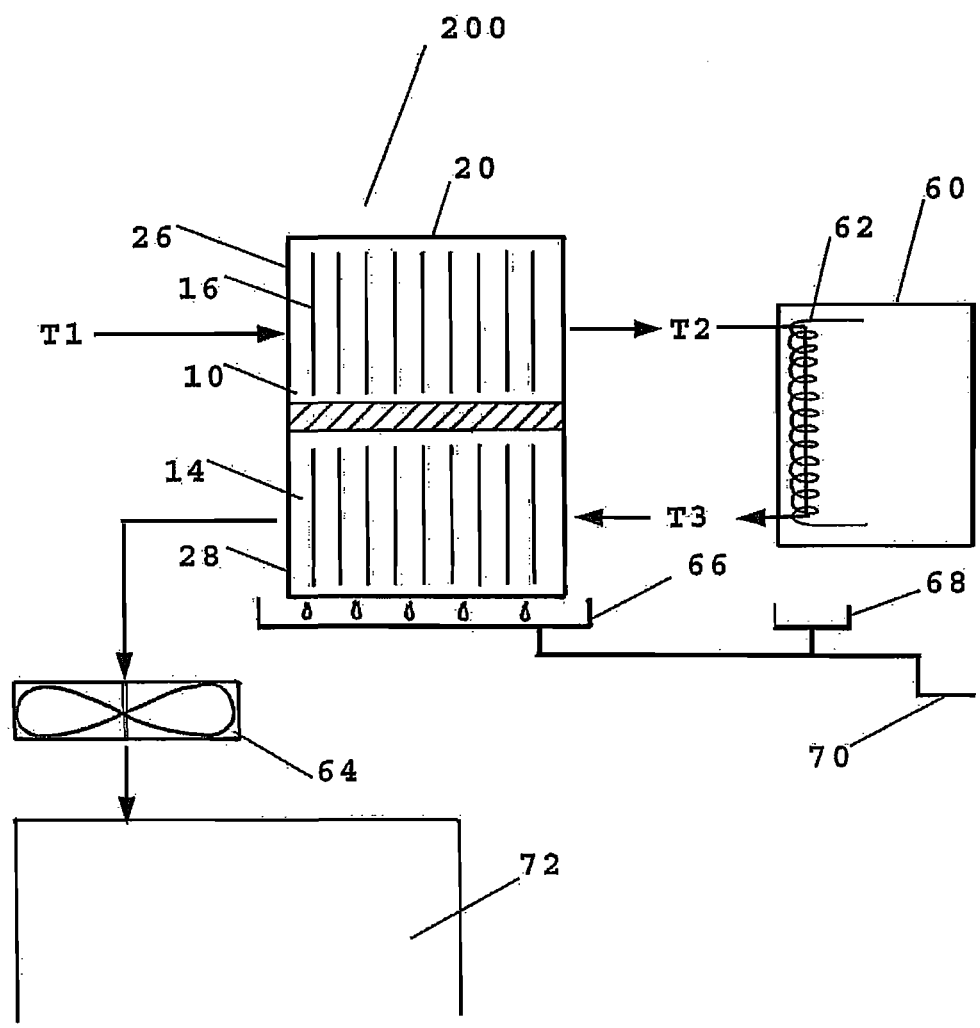
FIG. 5 shows a schematic representation of the manner in which the heat exchanger of the present invention may be arranged as a dehumidifier.

FIG. 5 shows a schematic representation of a dehumidifier 58 based on the heat exchanger 20 of the present invention. According to FIG. 5, dehumidifier 58 comprises a heat exchanger 20 as described in relation to FIG. 2. The heat exchanger 20 comprises primary and secondary channels 26, 28. There is also provided a fan 64 and an air conditioner 60 having a cooling element 62. The air conditioner 60 is a generally conventional device working on a refrigeration cycle. Cooling element 62 forms part of the evaporator coil of the refrigeration circuit. Beneath the heat exchanger 20 is located a drip tray 66. Beneath the cooling element 62 is located a gutter 68. Gutter 68 and drip tray 66 are connected to a drain 70. Not shown in FIG. 5 are flow connections arranged to connect an outlet from the primary channel 26 to convey air flow to the cooling element 62 and to connect the cooling element 62 back to an inlet to the secondary channel 28. Also not shown are flow connections leading from an outlet from the secondary channel 28 to the fan 64 and from the fan 64 to a habitable space 72.

In use, dehumidifier 58 operates as follows. Fan 64 operates to draw air through secondary channel 28 and deliver it to habitable space 72. The air is drawn in from the surroundings through primary channel 26 and over cooling element 62. The air entering the dehumidifier 58 at the inlet to primary channel 26 has a temperature T1 and a relative humidity of close to 100%. It is pre-cooled as it passes through the primary channel 26 by heat transfer to the secondary channel 28, the heat transfer taking place along the plates 10. As it cools, moisture present in the air condenses and is collected on the fins 14 the slits 16 between the fins allow the condensed water to drain to the drip tray 66 where it is collected. In order to assist the collection of condensate, the fins 14, especially in the primary channel may be provided with an appropriate coating to encourage wicking or drainage of water.

On leaving the primary channel, the air will have a temperature T2, lying below T1. The relative humidity will be 100%. The air then passes over cooling element 62 where it exchanges heat with the refrigerant of air conditioner 60. The air is cooled to a yet lower temperature T3. During the further cooling by cooling element 62, the air follows the saturation line of 100% humidity and further water is condensed. This water is collected in gutter 68 and together with the water from drip collector 66 is passed to drain 70. As the cooled air leaves the cooling element 62 it is returned to the heat exchanger 20 and passes through secondary channel 28. As the air passes through the secondary channel 28 it is warmed by heat transfer with the air flowing in primary channel 26. The efficiency of the heat exchange is such that on exit from the secondary channel 28, the air will have substantially attained its initial temperature T1. It will however have lost significant moisture and will have a relative humidity much lower than that of the ambient air.

Figure 6:
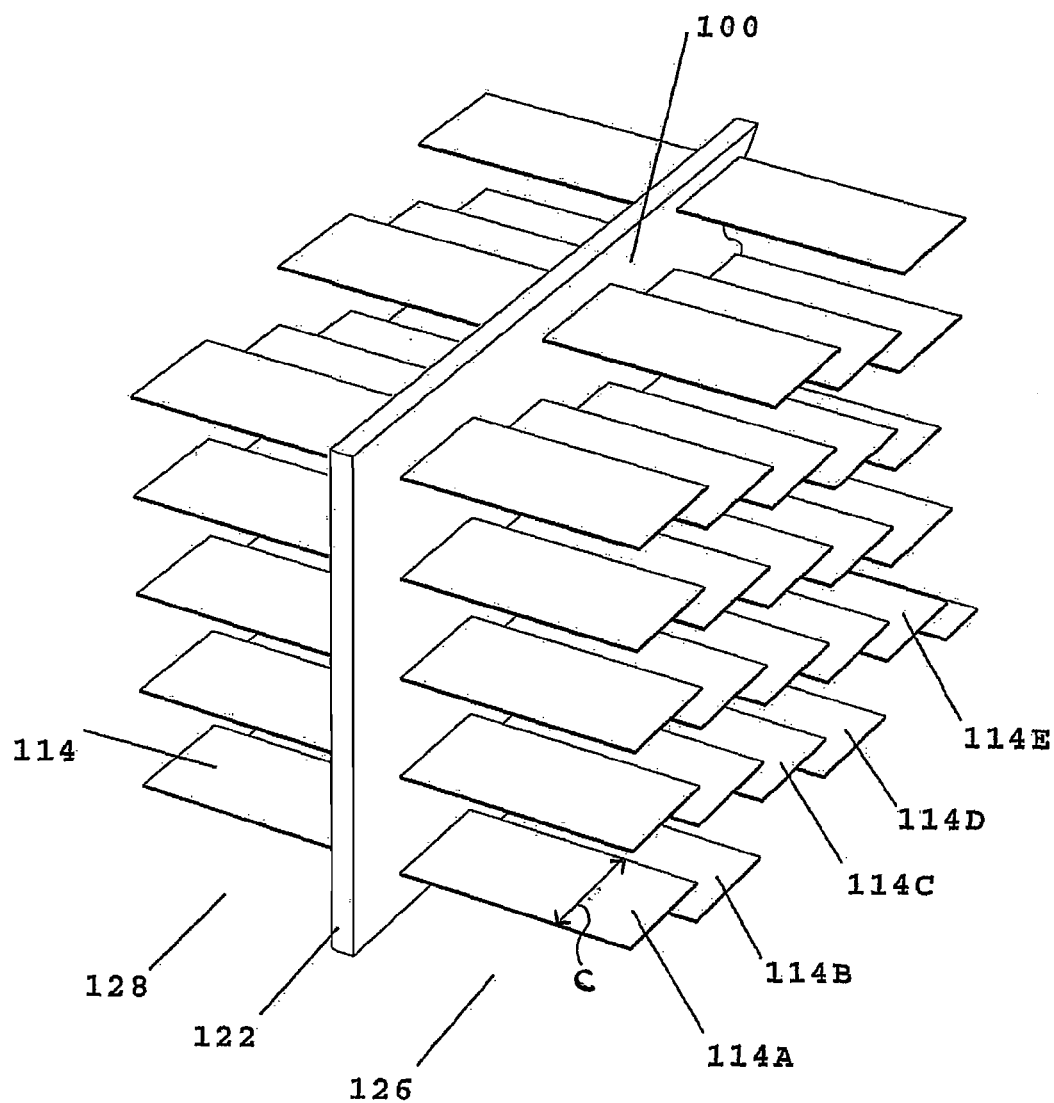
FIG. 6 shows a perspective view of part of a heat exchanger according to a second embodiment of the invention.

FIG. 6 shows a perspective view of an element of a heat exchanger 100 according to a second embodiment of the invention. According to FIG. 6, there is provided a spacer 122 having fins 114 protruding from both of its surfaces. The areas on either side of the spacer form a primary 126 and secondary 128 channel. Unlike the embodiment of FIGS. 1 to 3, the fins 114 of the heat exchanger of FIG. 6 are not part of a metal plate. The fins 114 are elongate strips of conducting material, individually embedded within the spacer 122. Each fin 114 is continuous and passes through the spacer 122. In this manner each fin 114 is embedded in the spacer 122 such that it protrudes into both the primary and secondary channels. As can be seen from FIG. 6, the fins 114 are arranged in groups of fins 114A-E which correspond in spacing to the positions of the previous embodiments. Other variations of these positions are of course also possible. Furthermore, while flat strips are depicted, reference to fins is intended to also include more complex shapes including aerofoil shapes, rods, tubes and the like. The heat exchanger 100 of FIG. 6 may also be the incorporated into devices such as the dew point cooler of FIG. 4 or the dehumidifier of FIG. 5.

Figure 7A:
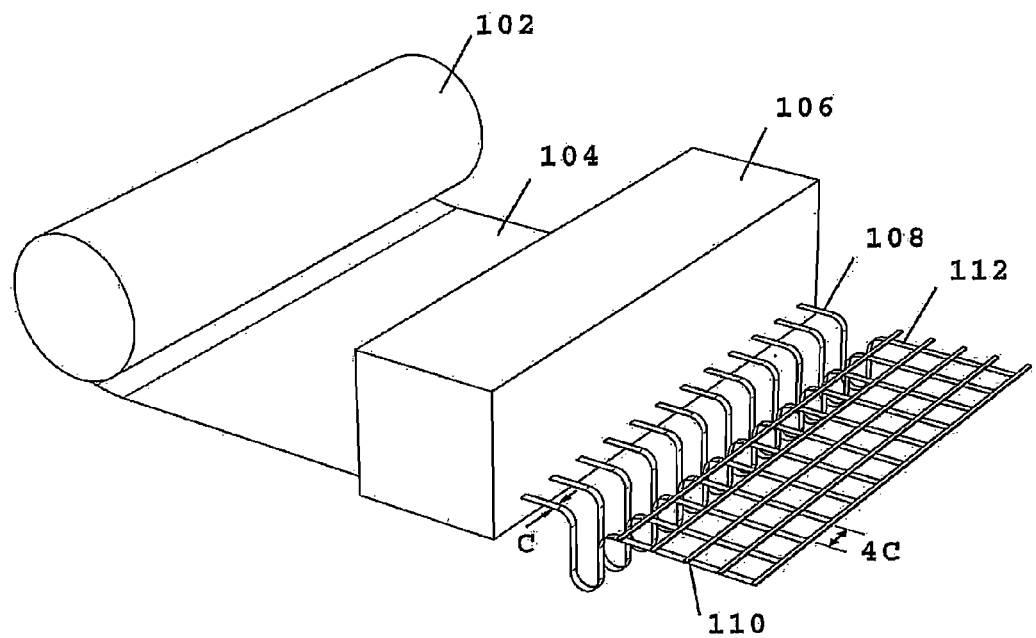
FIG. 7A to 7C show steps of a first method of manufacture of the heat exchanger according to the second embodiment of the invention.
Figure 7B:
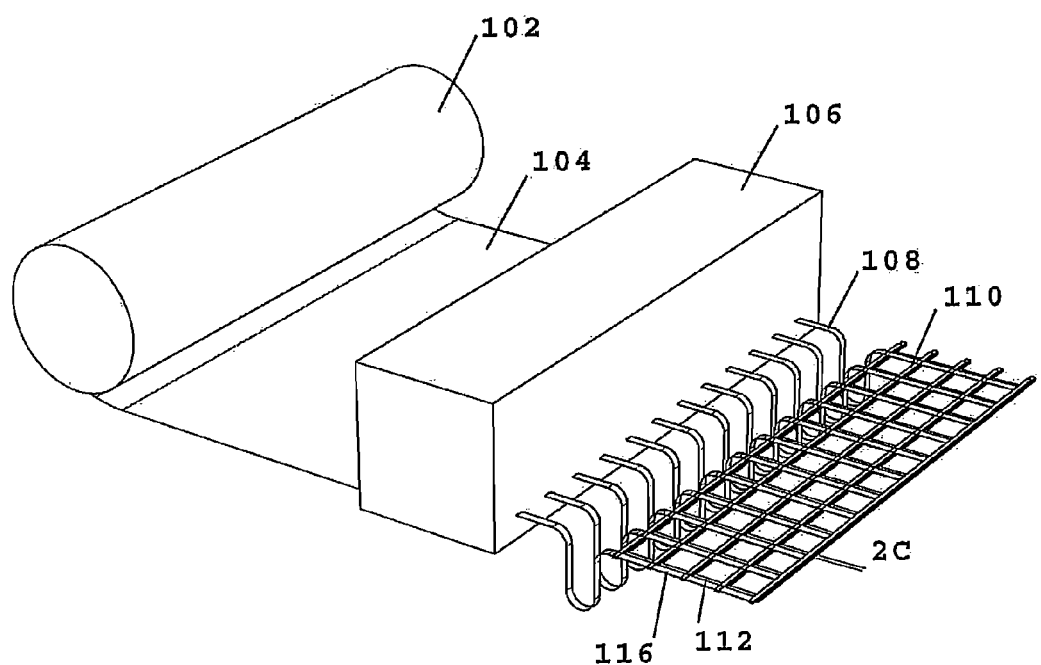
Figure 7C:
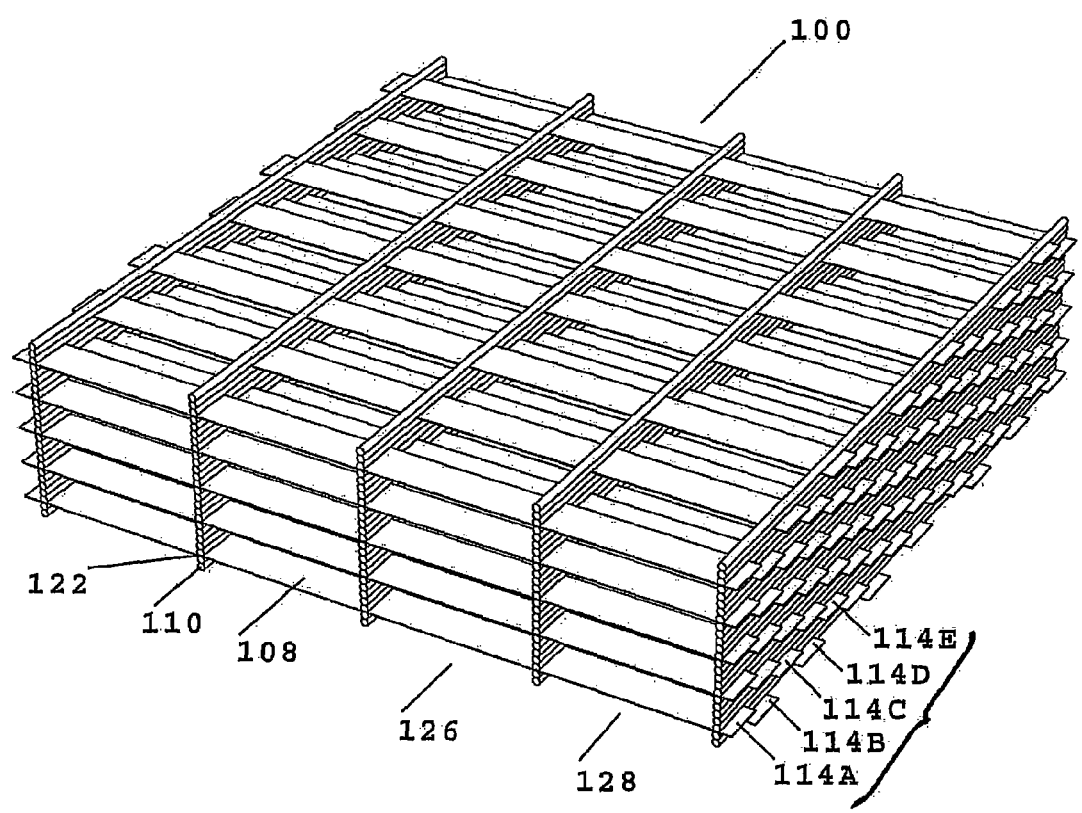

FIG. 7A to 7C show steps of a first method of manufacture of a heat exchanger 100 according to the second embodiment of the invention. According to FIG. 7A there is shown a supply 102 of aluminium sheet 104. The sheet 104 is fed to a shredder 106, which produces a plurality of separate strips 108 having a width c. This dimension will henceforth be referred to as chord c. A first row 112 of strips 108 in spaced parallel lines, are set down on a jig (not shown). Each strip 108 is spaced from its neighbour by a distance corresponding to four times the chord c. A plurality of beads 110 of plastics material are extruded over the strips 108 in generally orthogonal relationship therewith. The beads 110 may be extruded from extrusion nozzles generally known in the art which are not further described herein.

FIG. 7B shows a subsequent step in the method of manufacture of heat exchanger 100. Subsequent to the extrusion of the beads 110, a second row 116 of strips 108 is set down over the beads 110. The strips 108 in the second row 116 lie parallel to the strips 108 in the first row 112 but are staggered with respect to the strips 108 of the first row 112 by twice the chord c. Thereafter, further alternate layers of beads 110 and strips 108 are applied over one another to build up a three dimensional structure.

FIG. 7C shows the completed heat exchanger 100. Since each layer of beads 110 is extruded in molten form onto the layers below, it sets into intimate contact with the beads 110 in the layer below. In this manner, a continuous spacer 122 is produced having fins 114A-E protruding from each surface. Unlike the heat exchanger element depicted in FIG. 6, the heat exchanger 100 of FIG. 7C comprises a plurality of primary and secondary channels 126, 128 whereby the fins 114A-E are continuous across all the channels. As will be understood by the skilled person, numerous variations may be practiced in the manufacture of the heat exchanger 100. As in the previous embodiments, the strips 108 may be formed of any other suitable heat conducting material including copper or composite materials. The strips 108 may also be provided with suitable coatings or coverings in order to improve their performance, in particular water retentive layers. Furthermore, while the beads 110 and spacers 122 are shown to be generally straight, a curved or wave shape wall may also be formed in order to improve the strength of the structure.

FIGS. 8A to 8E shows steps of a second method of manufacture of the heat exchanger according to the second embodiment. According to FIG. 8A, a mould 130 is provided comprising an upper half 132 and a lower half 134. The upper and lower halves 132, 134 are generally complementary in shape and have stepped surfaces 136A-E running in a first direction and longitudinal grooves 138 running in a second direction generally perpendicular to the first direction.

Figure 8A:
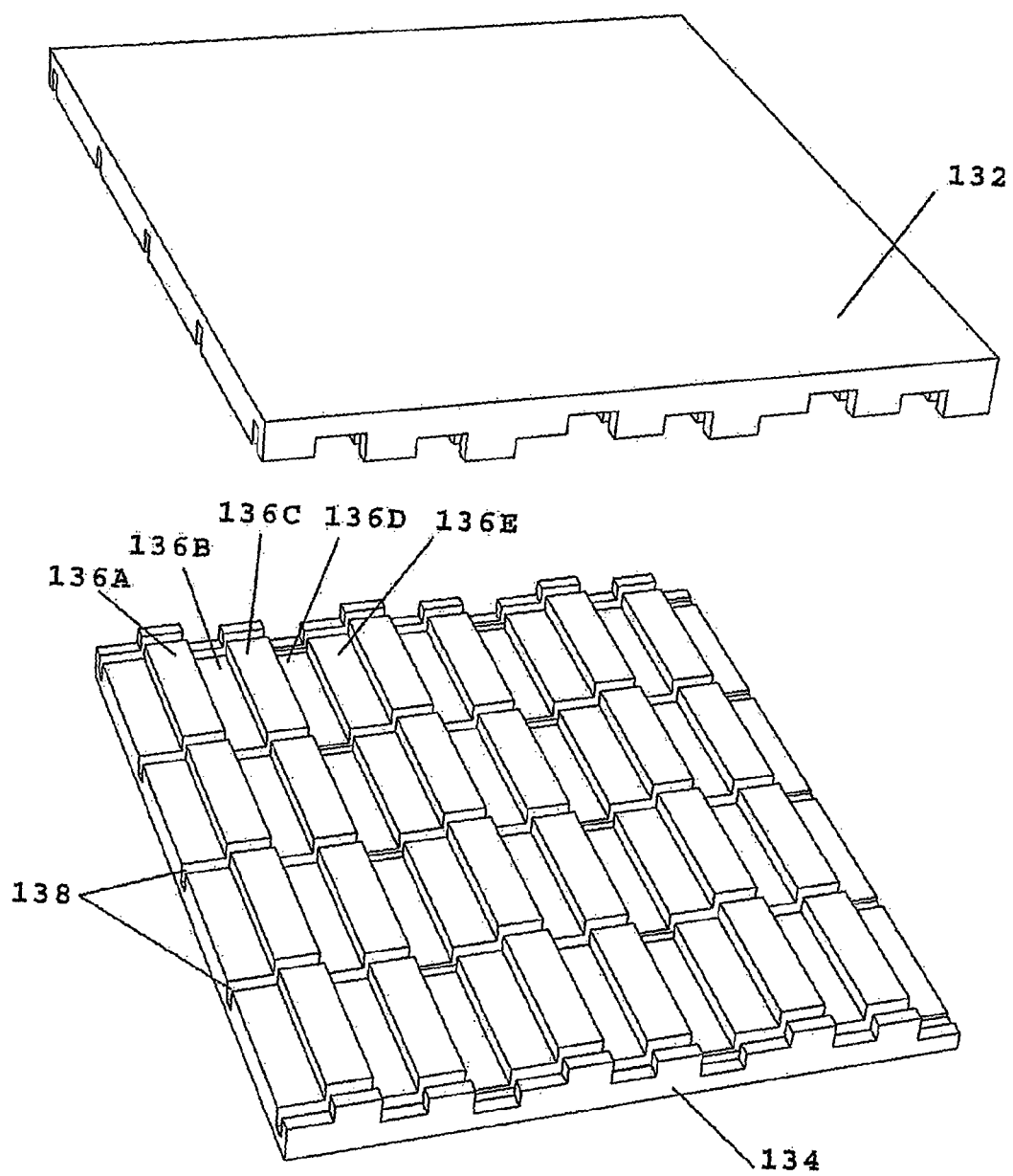
FIGS. 8A to 8E shows steps of a second method of manufacture of the heat exchanger according to the second embodiment.
Figure 8B:
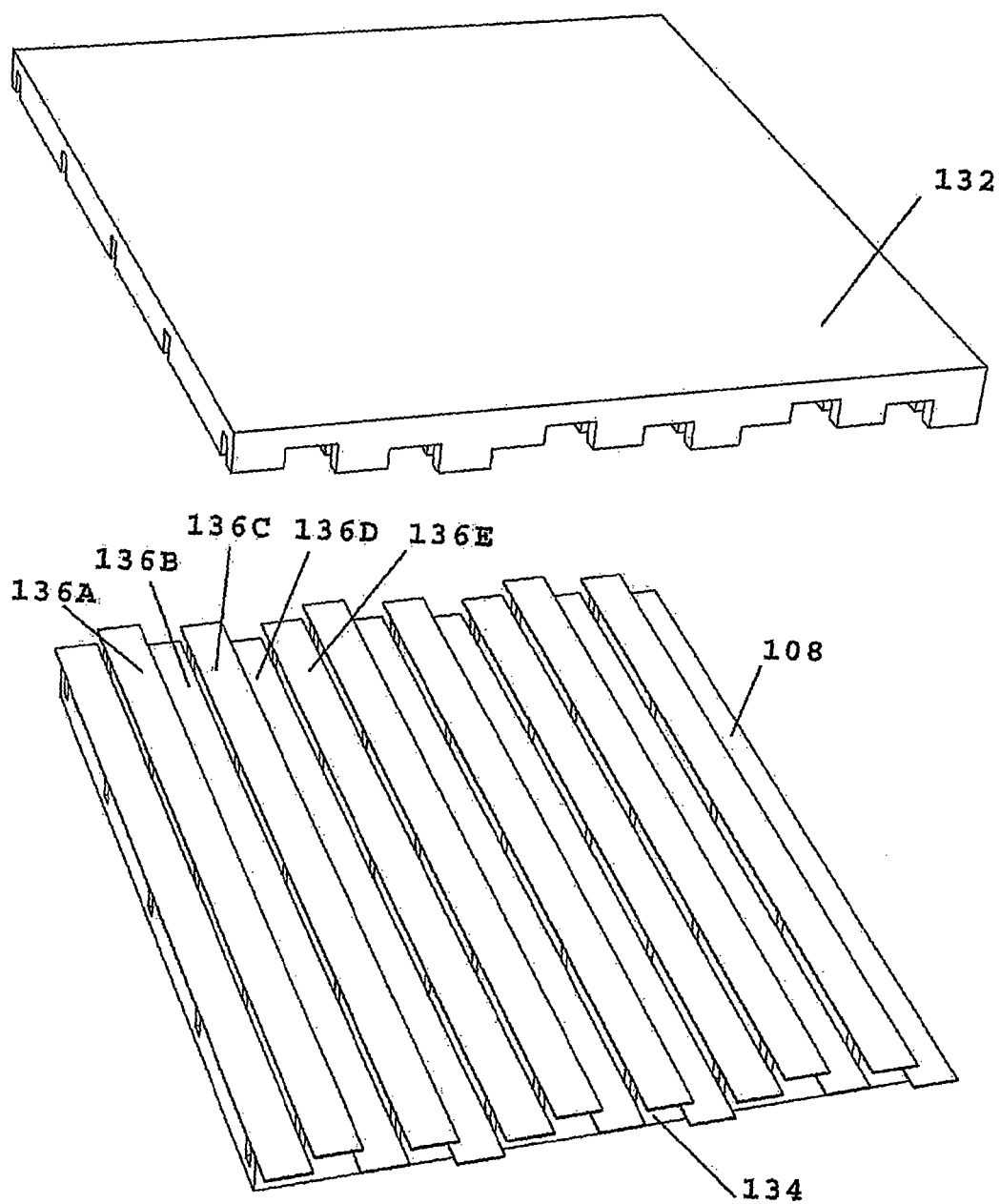

In FIG. 8B, a plurality of aluminium strips 108 are placed onto the stepped surfaces 136 A-E of the lower mould half 134. The strips 108 may be produced by a device such as shredder 106 of FIG. 7A or may be supplied directly as pre cut strips. It is also possible that a plate is cut into strips 108 by action of the mould 130 or an appropriate press.

Figure 8C:
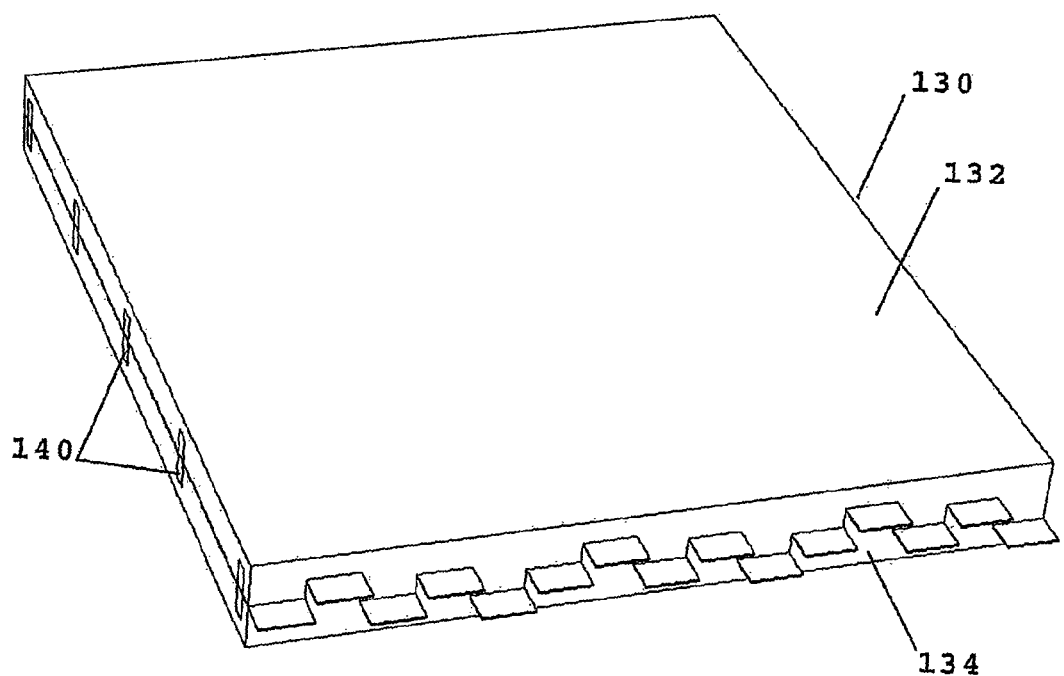

In FIG. 8C the upper mould half 132 is placed over the lower mould half 134 to close the mould 130. A molten plastic material 140 is injected into grooves 138 according to conventional injection moulding techniques.

Figure 8D:
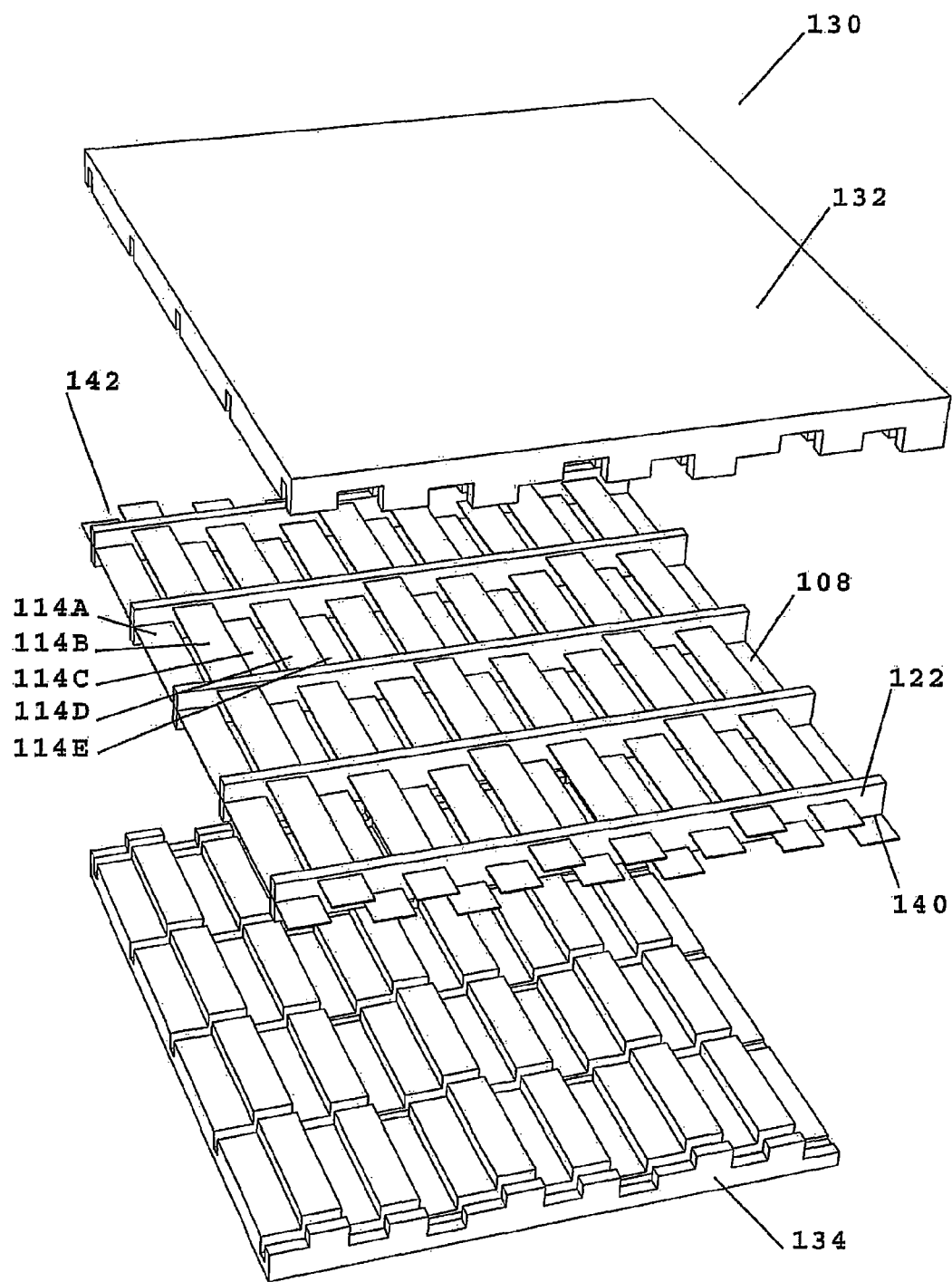

In FIG. 8D, on cooling of the plastic material, the mould 130 is opened. The plastic material 140 has set to form a heat exchange element 142 in the form of a generally rectangular grid with spacers 122 having strips 108 embedded therein as fins 114A-E.

Figure 8E:
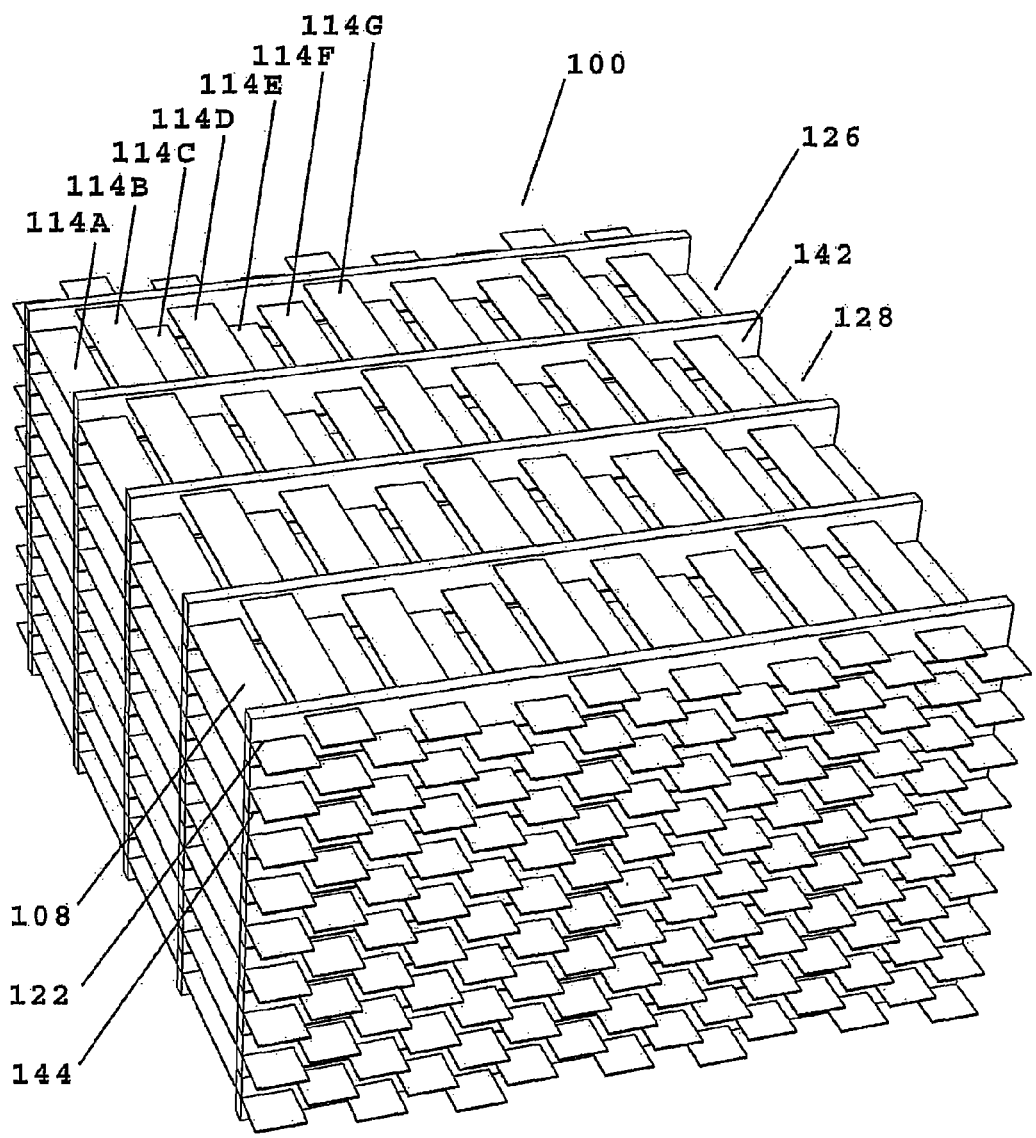

In FIG. 8E the heat exchange element 142 is stacked with further similar elements 142 to form a heat exchanger 100 having primary and secondary channels 126, 128. Suitable adhesive material 144 is applied between adjacent elements 142 in order to form a unitary structure. The skilled person will readily recognise that alternative joining techniques may be used. In particular, the spacers 122 may be formed with complementary upper and lower surfaces that engage together (e.g. tongue and groove). The complementary surfaces may be merely for alignment purposes but may also serve to mechanically connect the elements 142 with or without subsequent adhesive. As noted in relation to the embodiments above, the spacers need not be straight but may alternatively follow a curved, wavy or zig-zag path in order to increase the structural rigidity of the final heat exchanger. Furthermore, while flat strips 108 are depicted, fins 114A-G may also have alternative cross sections as described above or may be angled. It is thus within the scope of the invention that the strips 108 are angled in the region of the primary channel 126 differently to the secondary channel 128. In this manner different flow regimes may be applied to the heat exchanger 100 including both counter flow and cross flow.

Thus, the invention has been described by reference to certain embodiments discussed above. It will be recognized that these embodiments are susceptible to various modifications and alternative forms well known to those of skill in the art. In particular, the arrangement of the cooling element may be distinct from the schematically illustrated design of FIG. 5 and further cooling elements may also be provided. Furthermore, although illustrated as a dew point cooler and as a dehumidifier, the heat exchanger of the present invention may be adapted for use in other systems where efficient heat exchange or recovery is of importance. Furthermore, although the heat exchanger has been described as a stacked arrangement of generally planar plates it is noted that other configurations may achieve similar effect e.g. by rolling the heat exchange plate and spacers to form a roll or the like.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. An evaporative heat exchanger comprising:
a plurality of generally planar, heat conducting plates stacked in a Z-direction in spaced, generally parallel relationship;
spacing elements of plastics material extending in an X-direction, separating the plates from one another and defining separated first and second flow channels between pairs of adjacent plates for flow in a first direction and a second direction respectively;
wherein the plates extend in a Y-direction through both the first flow channel and the second flow channel and are divided into fins, the fins having a chord length and being separated from each other in the X-direction and being offset from the plate in the Z-direction to at least four offset positions, the fins being arranged in repeating groups, whereby the fins of each repeating group are staggered with respect to one another in the X-direction and offset from one another in the Z-direction such that a pitch of corresponding fins in adjacent groups in the X-direction corresponds to at least three times the chord length,
whereby the flow in the first direction can flow both over and under a respective fin;
the heat exchanger further comprising a water retaining surface on the fins in at least the second flow channel; and
a source of water for wetting the fins in the secondary channel.

2. The heat exchanger according to claim 1, wherein the pitch of corresponding fins in adjacent groups in the first direction corresponds to at least five times the chord length.

3. The heat exchanger according to claim 1 comprising a plurality of first and second flow channels.

4. The heat exchanger according to claim 1 wherein the offset fins in each channel are formed to have the same absolute length as each other.

5. A method of manufacture of the heat exchanger according to claim 1, comprising:
providing the generally planar heat conducting plate;
forming the plate into a plurality of fins joined to one another and being offset from the plane of the plate to a plurality of offset positions;
applying elongate strips of spacing material to the plate to form a grid;
repeating the above to form further grids; and
stacking the grids to form a plurality of first and second flow channels.

6. The method of claim 5 wherein multiple strips of spacing material are extruded onto the plate concurrently.

7. The method of claim 5 wherein the spacing material is provided as an injection moulded frame at least partially coated with an adhesive, preferably a heat activated adhesive.

8. The method of claim 5 wherein a plurality of grids of formed plates and spacing material are stacked together and then subjected to pressure and/or heat to adhere the grids to one another.

9. The method of claim 5 wherein the heat conducting fins have a chord length and are arranged in repeating groups, whereby the fins of each repeating group are staggered with respect to one another in the first direction and offset from one another in a direction perpendicular to the first direction and whereby the pitch of corresponding fins in adjacent groups in the first direction corresponds to at least three times the chord length.

10. The heat exchanger according to claim 1:
wherein the fins extend through the spacing element and into both the first and second flow channels, the fins in at least the first channel having a chord length and being arranged in repeating groups, whereby the fins of each repeating group are staggered with respect to one another in the first direction and offset from one another in a direction perpendicular to the first direction and whereby the pitch of corresponding fins in adjacent groups in the first direction corresponds to at least three times the chord length.

11. The device as claimed in claim 10, wherein the fins comprise individual strips of conductive material extending separately through the spacing element.

12. The device as claimed in claim 10, the plates being cut to form the fins in the primary and secondary flow channels.

13. The device according to claim 10, further comprising a plurality of spacing elements and a plurality of first and second channels.

14. The heat exchanger as claimed in claim 10, further comprising a water retaining surface on the fins in at least the secondary channel and a source of water for wetting the fins in the secondary channel.

15. The heat exchanger as claimed in claim 10, further comprising a cooling element, the heat exchanger being arranged to pass a flow of air through the primary channel to the cooling element and to return the cooled air from the cooling element through the secondary channel.

16. The device as claimed in claim 1, wherein the spacing elements comprise thermally insulating material.

17. The heat exchanger as claimed in claim 1, further comprising a cooling element, the heat exchanger being arranged to pass a flow of air through the first channel to the cooling element and to return the cooled air from the cooling element through the second channel.

18. A method of manufacture of the heat exchanger according to claim 1 comprising, in no particular order, the steps of;
providing a plurality of strips of elongate heat conducting material;
forming a spacing element which separates a first flow channel for flow in a first direction and a second flow channel for flow in a second direction in the heat exchanger; and
incorporating said strips of elongate heat conducting material into the spacing element so that each elongate strip forms a heat conducting fin extending through the spacing element and into both the first and second flow channels.

19. The method of manufacture according to claim 18 wherein the strips of elongate heat conducting material are formed by shredding or stamping a plate of heat conducting material.

20. The method of manufacture according to claim 18 wherein the spacing element incorporating the elongate strips is formed by; providing a first layer of spaced, substantially parallel elongate strips of heat conducting material in a single plane;
applying elongate strips of spacing material to the first layer of heat conducting strips,
substantially perpendicular to the heat conducting strips, to form a grid;
applying a second layer of spaced, substantially parallel heat conducting strips in a single plane to the previously applied spacing material;

applying elongate strips of spacing material to the second layer of heat conducting strips coincident with the previously applied spacing material.

21. The method of manufacture according to claim 18 wherein a mould comprising a first half having a plurality of spaced, substantially parallel platforms, on which elongate strips of heat conducting material can be placed, and grooves running substantially perpendicular to the platforms; and a second half complementary to the first half, is provided; and wherein the spacing element incorporating the elongate strips is formed by placing elongate heat conducting strips onto the platforms and injecting a suitable material into the grooves in order to form spacing elements; thereby forming a grid.

22. The method of manufacture according to claim 21 wherein a plurality of grids are formed and then stacked to form a plurality of first and second flow channels.

23. The method of manufacture according to claim 21 wherein the platforms are at different heights with respect to one another such that the strips are offset from one another in a direction perpendicular to the first direction.

24. The method according to claim 18 wherein the heat conducting fins have a chord length and are arranged in repeating groups, whereby the fins of each repeating group are staggered with respect to one another in the first direction and offset from one another in a direction perpendicular to the first direction and whereby the pitch of corresponding fins in adjacent groups in the first direction corresponds to at least three times the chord length.

* * * * *